United States Patent [19]

Broida

[11] Patent Number: 4,468,106

[45] Date of Patent: Aug. 28, 1984

[54] CAMERA SYSTEM

[76] Inventor: Joel G. Broida, 110 Dielman Rd., St. Louis, Mo. 63124

[21] Appl. No.: 172,774

[22] Filed: Jul. 28, 1980

[51] Int. Cl.³ .............................................. G03B 15/03
[52] U.S. Cl. .................................................... 354/137
[58] Field of Search ........ 354/34, 60 F, 129, 137–141, 354/149, 139; 352/49, 85

[56] References Cited

U.S. PATENT DOCUMENTS 3,683,769  8/1972  Uchiyama et al. ........... 354/60 F X

OTHER PUBLICATIONS

Life Library of Photography, "Making A Still Picture Show Movement", vol. Special Problems, 1971, pp. 128–133.

*Primary Examiner*—William B. Perkey
*Attorney, Agent, or Firm*—Polster, Polster, and Lucchesi

[57] ABSTRACT

In a camera system wherein a shutter is opened to expose a photographic sensitized film to light to record an image and the shutter is subsequently closed after a predetermined time and a flash device such as a flashbulb is actuated during the time the shutter is open, an electric timer is connected to be initiated by the opening of the shutter, and to the flash device for energizing the flash device after a predetermined time interval following the initiation of the timer by the opening of the shutter and before the shutter is closed. In taking a photograph of a moving object, the opening of the shutter while the camera is held steady exposes the film at a light value insufficient to produce a desired final exposure but sufficient to produce a blurred image, and the actuation of the flash device produces a clear stopped image, so that the effect of motion is achieved on the photograph.

4 Claims, 4 Drawing Figures

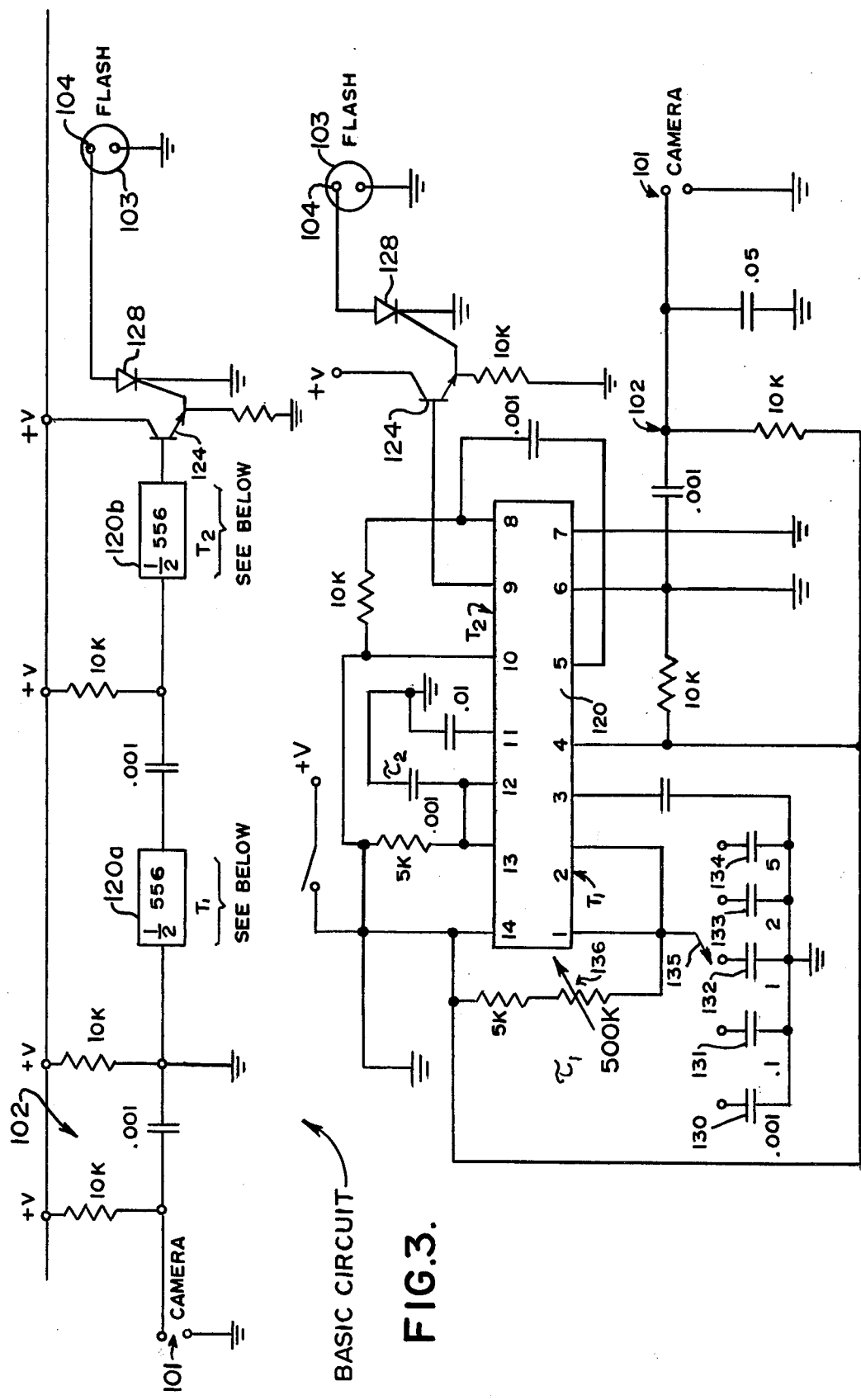

CAMERA SYSTEM

BACKGROUND OF THE INVENTION

In making action pictures of sports events, it is desirable to give the impression of speed and motion. However, if the shutter speed is deliberately made slow enough to blur the picture, there is no sharp image of the person or thing in motion. Panning produces a blurred background and at the same time is difficult.

An object of this invention is to provide a way of producing a trailing blur behind a sharp image against a distinct background a highly reproducable sequence, for actions at almost any speed.

Another object is to provide such a device that is inexpensive and compact.

Other objects will become apparent to those skilled in the art in the light of the following description and accompanying drawings.

SUMMARY OF THE INVENTION

In accordance with this invention, generally stated, in a camera system wherein a shutter is opened to expose a sensitized photographic film to light to record an image and the shutter is subsequently closed after a predetermined time, and a flash device such as a flashbulb or electronic flash is activated during the time the shutter is open, an electrical timing device is provided operatively connected to be initiated by the opening of the shutter, and operatively connected to the flash device for actuating the flash device after a predetermined time interval following the initiation of the timer by the opening of the shutter and before the shutter is closed, the time interval being sufficiently long and the light exposure sufficiently low to produce an underexposed, blurred image of a moving object before the flash device is energized and the shutter closed. In the method of this invention, the camera is held steady, and the film is exposed initially at a light value insufficient to produce a desired final exposure but sufficient to produce a blurred image and, when the flash device is energized, a sharp image is produced and the shutter closed.

BRIEF DESCRIPTION OF THE DRAWING

In the drawing,

FIG. 3 is a diagrammatic view of another embodiment of circuit; and

FIG. 4 is a somewhat more detailed diagrammatic view of the circuit of FIG. 3.

DESCRIPTION OF THE PREFERRED EMBODIMENT

Figure 1:
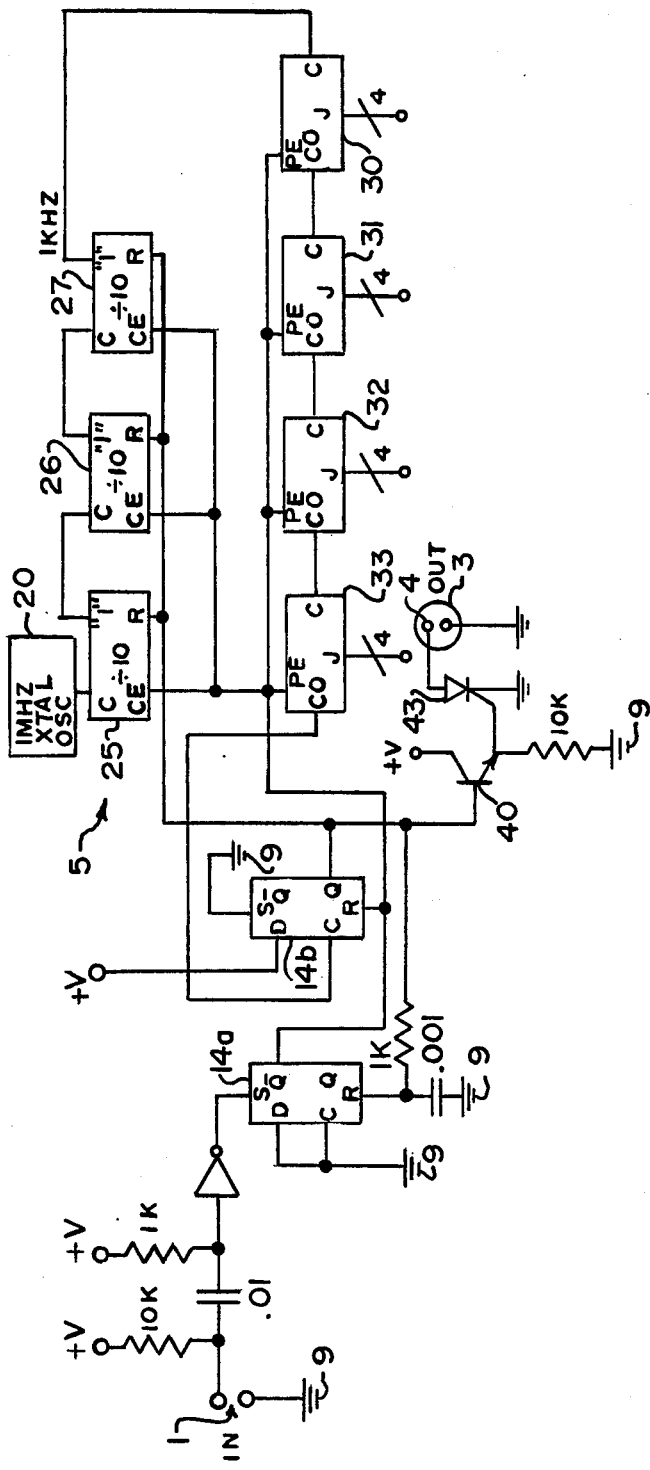
FIG. 1 is a diagrammatic view of one illustrative electrical circuit of this invention.

Referring now to FIG. 1 for an illustration of the preferred embodiment of this invention, reference numeral 1 indicates a camera shutter-switch, a part of a camera. A timer circuit 5 is electrically connected to the shutter-switch 1 and to a terminal 4 of a flash device 3.

Figure 2:
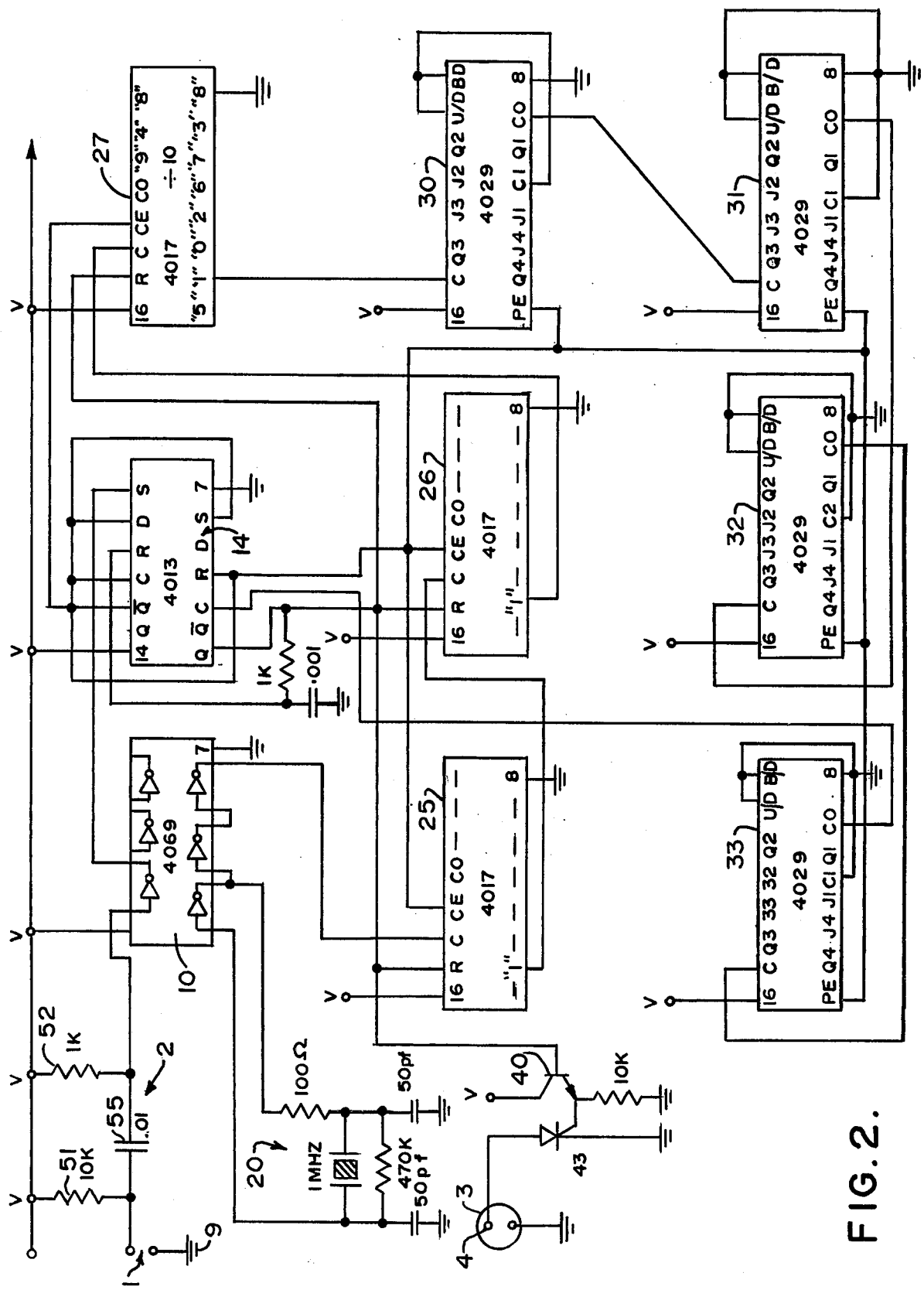
FIG. 2 is a more detailed diagrammatic view of the circuit of FIG. 1.

In the preferred embodiment of circuit, shown in FIGS. 1 and 2, the timer is a digital timer, the essential parts of which are a pulse signal developing circuit 2 which in this embodiment includes a pair of resistors 51 and 52 connected to a battery source not here shown, and capacitor 55, and inverter 10 of the type known in the electronics industry as 4069, a dual type D flip-flop with set/reset capability, shown in FIG. 1 as two flip-flops 14a and 14b, and in FIG. 2 as the single component known in the industry as a 4013, an oscillator 20, in the illustrative embodiment shown, a one megahertz crystal oscillator, three successive decade dividers 25, 26 and 27 with decoded outputs connected in series to supply one kilohertz input to four presetable up/down BCD (binary coded decimal) decade counters 30, 31, 32 and 33 respectively, and an SCR 43. The decade dividers can be of the type known as 4071, and the decade counters 30-33 of the type known as 4029. In the embodiment shown, a transistor 40 is connected in the circuit to trigger the SCR 43.

The inverter 10 is connected to the flip-flop 14a to give the proper input to the flip-flop which, upon receiving the signal produced by the closing of the shutter sets the flip-flop 14b, and initiates the counting of the decade counters 30-33. Those counters are preset selectively for any desired time delays, from zero to any desired number of seconds. In practical application, two to five seconds would be a long delay, but the amount of time will depend upon the anticipated speed of the object being photographed, and the delay can be programmed in thousandths of a second increments, from 0 to 9.999, using the four counters 30-33, in the illustrative example shown. When the counter has reached the predetermined count, a pulse, transmitted through the gated flip-flop 14b enables the transistor 40 and triggers the SCR 43 to actuate the flash device 3. In the illustrative embodiment shown, the flash device is an electronic flash, set off by the trigger voltage at its terminals when the SCR is triggered to act as a short circuit.

Referring now to the embodiment shown in FIGS. 3 and 4, an analog timer circuit is shown, operatively connected to camera shutter-switch 101 and to a terminal 104 of a flash device 103. The circuit of this embodiment utilizes a standard dual timer 120 of the type known in the industry as 556, which is controlled by an external resistor and a capacitor. In FIG. 3, the dual timer is shown diagrammatically as two timers, 120a and 120b, for clarity. The external capacitor by which the device is controlled, is, in this embodiment, shown as a series of capacitors of different capacitance with a wiper selectively to place one of them in the circuit and the resistor is a (variable) potentiometer.

In the embodiment of FIGS. 3 and 4, a pulse signal developing circuit 102 is provided to start the timer which, at the end of the timing cycle enables a transistor 124, to trigger an SCR 128 to energize the terminal 104 to set off the flash device 103.

The embodiment of FIGS. 3 and 4 is not the preferred embodiment, because, although it is simple and compact, it is somewhat more difficult to set for a predetermined time than is the digital timer.

In the use of the device, the preferred method is to set the timer circuit for a time delay commensurate with the speed of the action to be photographed, to set the lens aperture to produce underexposure without a flash and the proper exposure with a flash and to set the shutter speed to close the shutter immediately after the flash has been energized. The camera is held steady with the moving object to be photographed in view and the shutter tripped to open the shutter, start the timing circuit, energize the flash and close the shutter. The resultant photograph will show a continuous blur trailing a sharp image.

Numerous variations in the construction of the apparatus and performance of the method of this invention, within the scope of the appended claims, will become apparent to those skilled in the art in the light of the foregoing disclosure. The term flash device is used broadly to encompass any means for providing sudden bright illumination. Similarly the words camera and shutter are used to include any device by which an image receptor is exposed to an image for a predetermined time. The closing of the shutter is preferably immediately after the sharp image is formed by the exposure to the flash, but if it is desired to have a blur apparently preceeding the sharp image as well as trailing it, the shutter can be kept open after the flash has gone off. The various components of the system can be varied, as will be apparent to those skilled in the electronic timing circuit art, although the preferred embodiment shown has proved to be particularly effective, resetting immediately to enable a quick succession of photographs to be taken. Different timing circuits can be employed, e.g., a 16 KHz crystal can be used, and a 74C161/40161 chip to divide the 16 KHz pulse by 16 to to obtain the desired 1 Hz output. If it is desired to limit the range of time delays to 0-999 milliseconds, only three BCD decade counters need be used. These variations are merely illustrative.

Having thus described the invention, what is claimed and desired to be secured by Letters Patent is:

1. In a camera system wherein a shutter is opened to expose a photographic, sensitized film to light to record an image and the shutter is subsequently closed after a predetermined time, and a flash device is activated during the time the shutter is open, the improvement comprising electrical timing means operatively connected to be initiated by the opening of the shutter, and to said flash device for energizing the said flash device after a predetermined time interval following the initiation of the timer by the opening of the shutter and before said shutter is closed, said time interval being sufficiently long to cause the image of a moving object to blur before the flash device is energized and the shutter is closed.

2. The improvement of claim 1 wherein the timer is a digital timer.

3. The improvement of claim 1 wherein the timer is an analog timer.

4. The method of creating an action photograph of a moving object on sensitized film using a camera with a shutter and a flash device, comprising training said camera on said moving object, opening said shutter while holding said camera steady, exposing said film at a light value insufficient to produce a desired final exposure but sufficient to produce a blurred image, for and during a predetermined time in which the shutter is open, then energizing said flash device and thereafter closing said shutter.

* * * * *